United States Patent
Muehlhauser et al.

(10) Patent No.: US 8,041,442 B2
(45) Date of Patent: Oct. 18, 2011

(54) PROCESS FOR SELECTING SURROGATE PART

(75) Inventors: Adam Richard Muehlhauser, Ypsilanti, MI (US); Andrew Raymond Nowasielski, Shelby Township, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 235 days.

(21) Appl. No.: 12/509,607

(22) Filed: Jul. 27, 2009

(65) Prior Publication Data

US 2011/0022210 A1 Jan. 27, 2011

(51) Int. Cl.
| G06F 19/00 | (2011.01) |
| G06F 17/00 | (2006.01) |
| G06F 7/04 | (2006.01) |
| G06N 5/00 | (2006.01) |
| C25D 5/00 | (2006.01) |
| C25D 21/12 | (2006.01) |
| C25D 5/02 | (2006.01) |
| G01F 1/64 | (2006.01) |
| G01N 17/00 | (2006.01) |

(52) U.S. Cl. .......... 700/104; 700/97; 700/108; 700/123; 205/81; 205/120; 205/779; 706/45; 706/54

(58) Field of Classification Search .................. 700/97, 700/104, 108, 123; 706/45, 54; 205/81, 205/120, 779
See application file for complete search history.

(56) References Cited

U.S. PATENT DOCUMENTS

| 5,717,865 | A | | 2/1998 | Stratmann | |
| 6,027,630 | A | * | 2/2000 | Cohen | 205/135 |
| 6,195,643 | B1 | | 2/2001 | Maxwell | |
| 6,343,285 | B1 | * | 1/2002 | Tanaka et al. | 705/400 |
| 6,826,440 | B2 | * | 11/2004 | Yamamoto | 700/108 |
| 6,917,849 | B1 | * | 7/2005 | Pasadyn et al. | 700/121 |
| 7,295,999 | B1 | | 11/2007 | Simon et al. | |
| 7,321,858 | B2 | | 1/2008 | Andino, Jr. et al. | |
| 7,343,212 | B1 | * | 3/2008 | Brearley et al. | 700/106 |
| 7,519,215 | B2 | * | 4/2009 | Gower | 382/141 |
| 2002/0147519 | A1 | * | 10/2002 | Yamamoto | 700/108 |

* cited by examiner

*Primary Examiner* — Ronald Hartman, Jr.
(74) *Attorney, Agent, or Firm* — Gifford, Krass, Sprinkle, Anderson & Citkowski, P.C.

(57) ABSTRACT

A process for selecting a surrogate part for metallic plating, the metallic plating of the surrogate part predicting results for the metallic plating of a new or predetermined part is disclosed. The process can include providing a reinforcement learning system having a memory circuitry and a processing circuitry. The memory circuitry can have a database with data associated with a plurality of surrogate parts and data associated with the predetermined part can be entered into the data input module. The processing circuitry can compare the data associated with each of the plurality of surrogate parts and the data associated with the predetermined part and select a surrogate part that affords predicting a plating result of the predetermined part.

11 Claims, 3 Drawing Sheets

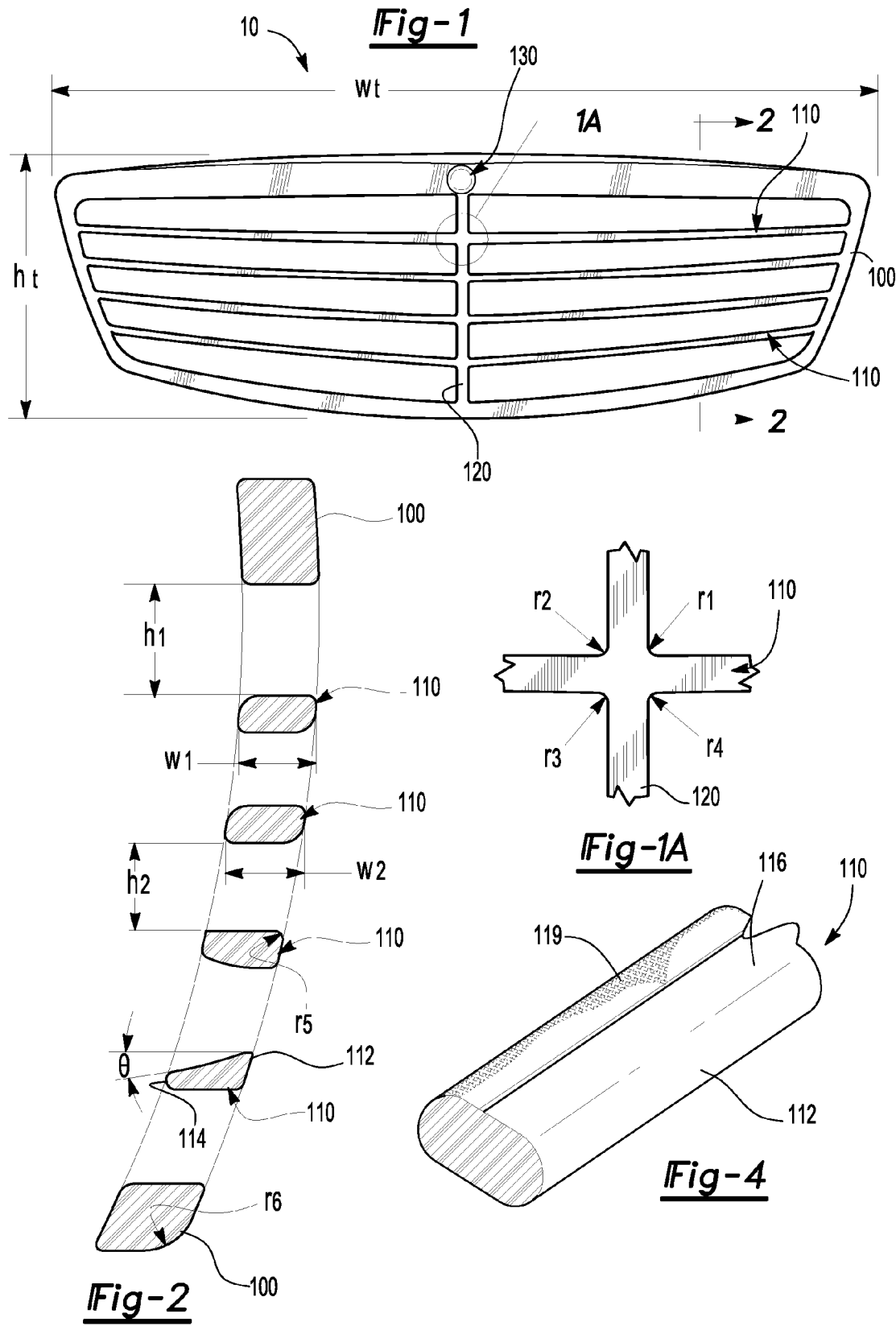

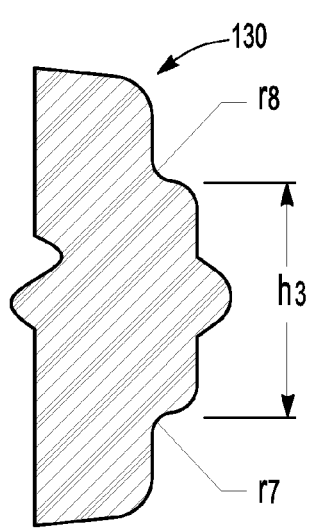
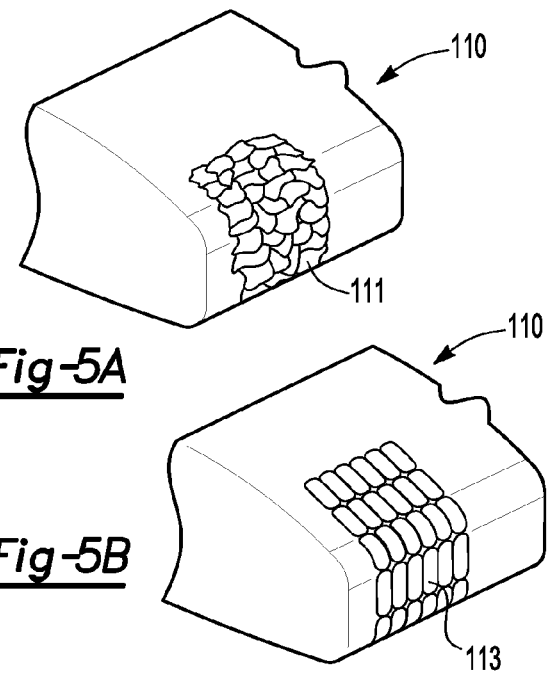
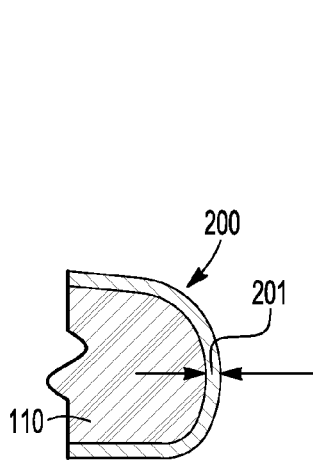
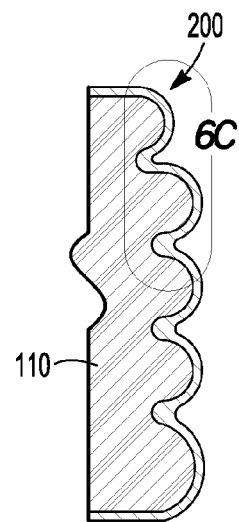
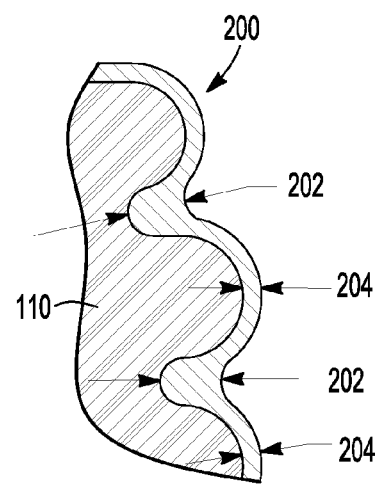
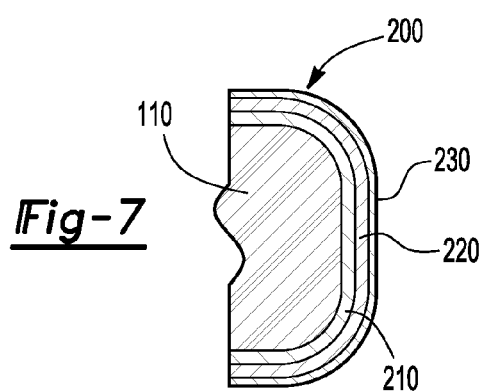

PROCESS FOR SELECTING SURROGATE PART

FIELD OF THE INVENTION

The present invention relates to a process for selecting a surrogate part that will assist the metallic plating of a predetermined part. In particular, the process is related to selecting a surrogate part that is a motor vehicle component and has been previously successfully metallic plated and using the surrogate part to predict a metallic plating result of a predetermined part.

BACKGROUND OF THE INVENTION

Metallic plating of various objects, components, instruments and the like is known. In addition, metallic plating, for example "chrome" plating, of various components that are included as part of a motor vehicle is also known. Considerations for metallic plating of such components can include overall size of a component, difficult to reach locations on and/or within a component, material of construction for a component, specific type of metallic plating to be applied to a component, and the like.

Heretofore practices for selecting a particular processing route and/or processing parameters, in order to plate a predetermined part or component that has not been plated before, have typically included trial and error with or without knowledge obtained from experienced personnel. Although such practices can be successful, they practices can also lead to excessive cost and time when a "best guess" fails. In addition, such practices can fail to take full advantage of prior successful metallic platings on previous components. As such, a process for selecting a part or component that has been previously metallic plated, with the selected part or component assisting in predicting a metallic plating result of a new component, would be desirable.

SUMMARY OF THE INVENTION

The present invention discloses a process for selecting a surrogate part to be metallic plated, the selection of the surrogate part and/or the metallic plating thereof predicting a result for the metallic plating of a new or predetermined part. The process can include providing a data input module that is operative to accept data on the predetermined part and/or desired or proposed plating parameters for plating the predetermined part. In addition, a reinforcement learning system having a memory circuitry and a processing circuitry can be included. The memory circuitry can have a database with data associated with a plurality of surrogate parts. The data can be related to size dimensions, physical dimensions, material parameters, plating process parameters and the like associated with one or more of the surrogate parts. In some instances, data associated with each of the plurality of surrogate parts is stored in the database.

Data associated with the predetermined part, which may or may not include the desired or proposed plating process parameters, can be entered into the data input module. In addition, the processing circuitry can calculate a difference between the data associated with the plurality of surrogate parts and the data associated with the predetermined part. The processing circuitry can also select one or more of the plurality of surrogate parts for metallic plating based on the difference between the data associated with the plurality of surrogate parts and the data associated with the predetermined part.

The one or more selected surrogate part(s) can be metallic plated using the desired or proposed set of plating parameters. Thereafter, a result of the metallic plating of the surrogate part can be determined. If the plating was successful, the predetermined part can be metallic plated using the same set of plating parameters. In the alternative, if the plating of the surrogate part was not successful, the set of plating parameters can be altered and used to plate the surrogate part, the change in parameters continuing until successful plating is achieved. Once a set of successful set of plating parameters have been obtained, they can be stored in the database in relation to the surrogate part and used to plate the predetermined part.

After plating the predetermined part using the successful set of plating parameters, a result of the plating can be determined. If the plating of the predetermined part is deemed unsuccessful, the plating parameters can be adjusted until a successful outcome is achieved. Thereafter the database can be updated with data associated with the predetermined part and a set of plating parameters that resulted in successful plating. In this manner, parameters of surrogate parts that have been successfully plated can be compared with parameters of a predetermined part in order to select a surrogate part that can assist in predicting successful metallic plating of the predetermined part. In addition, data associated with a successfully plated predetermined part can be stored and used in future surrogate part selection.

BRIEF DESCRIPTION OF THE DRAWINGS

FIG. 1 is a front view of a component to be metallic plated;

FIG. 1A is an enlarged view of the region labeled 1A in FIG. 1;

FIG. 2 is a side cross-sectional view of the section labeled 2-2 in FIG. 1;

FIG. 3 is a side cross-sectional view of an emblem pedestal on the component shown in FIG. 1;

FIG. 4 is a perspective view of a section of the component shown in FIG. 1;

FIG. 5A is a perspective view of the section shown in FIG. 4 illustrating a randomly oriented grained surface;

FIG. 5B is a perspective view of the section shown in FIG. 4 illustrating a non-randomly oriented grained surface;

FIG. 6A is a side cross-sectional view of the component shown in FIG. 4 illustrating a metallic plating thereon;

FIG. 6B is a side cross-sectional view of the component shown in FIG. 5A or 5B having a grain structure with a metallic plating thereon;

FIG. 6C is an enlarged view of the region labeled 6C in FIG. 6B;

FIG. 7 is a side cross-sectional view of a portion of the component shown in FIG. 4 illustrating a plurality of metallic layers.

DETAILED DESCRIPTION OF THE INVENTION

Figure 8:
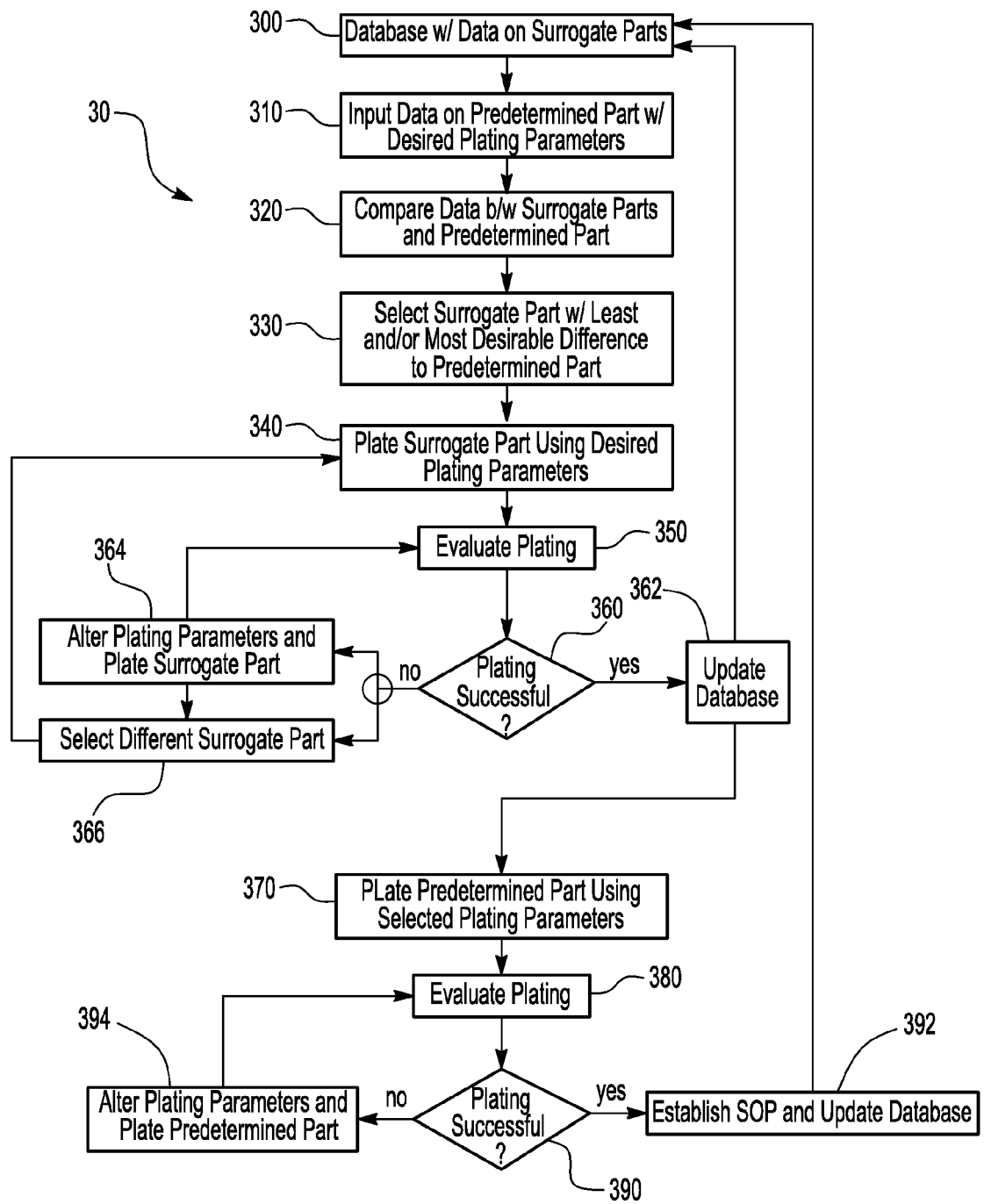
FIG. 8 is a schematic diagram illustrating a process according to an embodiment of the present invention.

The present invention discloses a process for selecting a surrogate part that will assist in the metallic plating of a predetermined part. As such, the process has utility for predicting a plating result of a component.

The process can include providing a data input module that is operative to accept data associated with the predetermined part to be metallic plated. It is appreciated that the predetermined part can be a component, instrument, decorative piece and the like to be metallic plated and can be made from any material known to those skilled in the art such as plastic, metal, ceramic, and the like. In some instances, the predetermined part is a component for a motor vehicle that is to be included as part of an upcoming, yet to be released, new model. For example and for illustrative purposes only, the predetermined part can be a radiator grille, trim piece, headlight structure and the like that is to be part of a motor vehicle model that has yet to be released into the market by a motor vehicle manufacturer.

The surrogate part can be a component, instrument, decorative piece and the like that has been successfully and/or unsuccessfully metallic coated or plated in the past. For example, the surrogate part can be a radiator grille, trim piece, headlight structure and the like that has been successfully metallic plated and included as part of a motor vehicle model that has already been released for sale to the public and is available on the market.

The process can also include providing a reinforcement learning system that has a memory circuitry and a processing circuitry. The memory circuitry can have a database with data associated with a plurality of surrogate parts. In some instances, the database can have data associated with each of the plurality of surrogate parts. The processing circuitry is operative to compare data associated with the predetermined part with data associated with the plurality of surrogate parts.

Data associated with the predetermined part can be entered into the data input module and may or may not include a desired and/or proposed set of plating process parameters to be used to plate the predetermined part. After the data has been entered, the processing circuitry can compare the data associated with the predetermined part with the data associated with the plurality of surrogate parts. Based on this comparison, one or more of the plurality of surrogate parts can be selected and used for metallic plate testing and afford for successful prediction of metallic plating of the predetermined part.

For example and for illustrative purposes only, if metallic plating of the surrogate part using the desired and/or proposed set of plating parameters is successful, then the desired and/or proposed set of plating parameters can be used to plate the predetermined part with greater confidence of a successful plating outcome. Thereafter, it can be determined whether or not this desired and/or proposed set of plating parameters resulted in successful metallic plating of the predetermined part. If successful plating has occurred, the database can be updated with the plating parameters of the predetermined part, which may or may not include the desired and/or proposed set of plating parameters, and then used for the selection of a different surrogate part to predict successful plating of a future predetermined part.

In the alternative, if the plating of the surrogate and/or predetermined part is not successful or is less than desirable, then the plating process parameters can be adjusted and the surrogate and/or predetermined part can be plated using the adjusted set of parameters. It is appreciated that this cycle can continue until a desirable set of plating parameters are determined, the result of which affords successful plating of the surrogate and/or predetermined part. Thereafter data associated with the surrogate and/or predetermined part, which may or may not the adjusted but desirable set of plating parameters, can be stored in the data base and used to select a surrogate part during a subsequent use of the inventive process. In addition, based on the plating results of the surrogate and/or predetermined part, the reinforcement learning system can apply weighting to one or more of the data associated with the surrogate parts in order to more accurately select a surrogate part that predicts successful plating of a subsequent predetermined part.

The data associated with each of the plurality of surrogate parts can include design data, process data, and/or material data. The design data can include a minimum radius of curvature that is present on the surrogate part, an overall height, an overall width, an overall depth, a height-to-depth ratio for one or more locations of a surrogate part, an angle that is present on the part, whether or not an emblem pedestal is present on the surrogate part, physical dimensions of the emblem pedestal if present, whether or not a grained surface is present on the surrogate part and combinations thereof. The process data can include molding parameters of a given part, a current density of a plating process used to plate the part, a racking orientation used during plating of the part, a racking design used to hold the part, whether or not plating-resistant paint was included during plating of the part, an identification of a plating supplier used to plate the surrogate part and combinations thereof. The material data can include a color of the metallic plating on the surrogate part, a number of plating layers applied to the surrogate part, plating bath components used to plate the surrogate part, the substrate material of the surrogate part and combinations thereof.

Turning now to FIG. 1, a front view of a component that can be metallically plated is shown generally at reference numeral 10. In some instances, the component 10 can be a radiator grille; however, this is not required. As shown in FIG. 1, the component 10 can have an overall height ht and an overall width wt. In addition, the component 10 can have an outer frame 100, a plurality of generally horizontal sections 110, one or more vertical sections 120 and the like. In some instances, the component 10 can have an emblem pedestal 130 to be discussed in greater detail below.

As shown in FIG. 1A, the generally horizontal sections 110 and the generally vertical section 120 can result in one or more radii of curvature as indicated by r1-r4. It is appreciated that a small or tight radius of curvature can be more difficult to metallic plate than a larger radius of curvature. As such, a radius of curvature can be an important parameter of the component when considering the metallic plating thereof.

Turning now to FIG. 2, a side cross-sectional view of the section 2-2 shown in FIG. 1 is provided. As shown in this figure, there can be space between the one or more generally horizontal sections 110 and/or between one or more of the generally horizontal sections 110 and the surrounding frame 100. For example, a space or distance hi can be present between the surrounding frame 100 and an adjacent generally horizontal section 110, and the generally horizontal section 110 can have a width w1. As such, this location of the component 10 can have a height-to-depth ratio equal to h1/w1 that can be an important metallic plating parameter to be considered when selecting a surrogate part to predict successful plating of a predetermined part. It is further appreciated that the distance or space between adjacent generally horizontal sections 110, e.g. h1, h2, etc., and their depth, e.g. w1, w2, etc., can also be important with respect to metallic plating.

FIG. 2 also illustrates that an angle, e.g. θ, can be present between a leading edge 112 and a trailing edge 114 of a generally horizontal section 110. It is appreciated that an angle can also be present between a leading edge and a trailing edge of the surrounding frame 100 and such angles can be important parameters to be considered when selecting a surrogate part. Also, a generally horizontal section 110 and/or surrounding frame 100 can have a radius of curvature r5 and r6, respectively, both of which are illustrative of physical dimensions or parameters that that should be considered when selecting a metallic plating process and/or selecting a surrogate part to be used to predict the plating success of a predetermined part.

Turning now to FIG. 3, a cross section of the emblem pedestal 130 of FIG. 1 is shown. The pedestal region 130, for which an emblem can be attached to and/or be used as an emblem, can also have one or more physical dimensions such as a height h3, a radius r7 and/or a radius r8. It is appreciated that these dimensions, radii, and the like can be critical and/or important when determining how to plate such a component and/or whether or not to select a surrogate part that has an emblem pedestal when trying to predict the successful plating of a predetermined part.

Referring now to FIG. 4, a portion of a generally horizontal section 110 is shown with the front surface 112 and a top surface 116. Spaced apart from the front surface 112 can be a masked off area 119 that has a plating-resistant paint, tape, and/or the like that can prevent or inhibit deposition of metallic material during a metallic plating process. In contrast, metallic material 117 can be deposited onto the front surface 112 and at least part of the top surface 116. It is appreciated that areas that inhibit and/or prevent the deposition of metallic plating material can be used to reduce the cost of plating such a component 10 and can be an important aspect and/or parameter to be considered when selecting a surrogate part to predict the successful plating of a predetermined part.

Turning now to FIGS. 5A and 5B, a portion of a generally horizontal section 110 that has a grained surface is illustrated. It is appreciated that the grained area can provide a rough or textured surface. In addition, the surface may have grains that are randomly oriented as shown at 111 in FIG. 5A or not randomly oriented as shown at 113 in FIG. 5B. Such grained surfaces can be provided during the casting and/or molding process of the component 10 and are known to those skilled in the art. It is appreciated that whether or not a surface has a grained surface can be an important parameter when choosing a metallic plating process and/or a surrogate part to predict successful plating of a predetermined part.

FIG. 6A illustrates a side cross-sectional view of a generally horizontal section 110 having a metallic coating 200. It is appreciated that the metallic coating 200 can be applied to the section 110 using a metallic plating process. In addition, the metallic coating 200 can have a thickness 201, the thickness 201 optionally being a critical and/or important parameter of the plating process and/or for selecting a surrogate part for predicting successful plating of a predetermined part. With reference to FIG. 6B, the generally horizontal section 110 is shown to have a grained surface with the metallic coating 200. As shown in the enlarged view of the region labeled 6C in FIG. 6B, FIG. 6C illustrates that the thickness of the coating 200 can vary as a function of the position or location of the grained surface. For example, the coating 200 can have a relatively thick section 202 and a relatively thin section 204. It is appreciated that the thick section 202, the thin section 204, the difference between the thick section 202 and the thin section 204, and/or the ratio of thick section 202 to thin section 204 may or may not be a critical and/or important parameter when selecting a surrogate part for predicting the metallic plating success of a predetermined part.

Turning now to FIG. 7, a side cross-sectional view of a generally horizontal section 110 is shown with a plurality of metallic layers thereon. For example and for illustrative purposes only, the section 110 can be made from a polymeric material and have a copper coating or film 210, a nickel coating or film 220 and a chromium coating or film 230. It is appreciated that a particular coating 200 can have a variety of different layers with different thicknesses in order to provide a desired overall thickness, appearance and the like. For example and for illustrative purposes only, a component or part made from a polymeric material can have a copper layer 210 on the order of 25 microns thick, a nickel layer 220 on the order of 25 microns thick and a chromium layer 230 on the order of 0.2 microns thick. Such values are for example purposes only, and the range of values that various layers can have is known to those skilled in the art.

Turning now to FIG. 8, a schematic diagram illustrating an embodiment of a process for selecting the surrogate part is shown generally at reference numeral 30. The process 30 can include a database with data on a plurality of surrogate parts at step 300. At step 310, data on a predetermined part can be input into a data input module. The input data can include desired and/or proposed plating parameters to be used for plating the predetermined part, along with design parameters, process and/or molding parameters, and/or material parameters. Thereafter, a processing circuitry of a reinforcement learning system can compare and/or analyze data associated with the surrogate parts with the input data associated with the predetermined part at step 320. As a result of the comparison and/or analysis, the reinforcement learning system can select one or more surrogate parts with the least and/or most desirable difference relative to the predetermined part at step 330.

At step 340, the surrogate part can be plated using the desired and/or proposed plating parameters and the result of the plating process can be evaluated at step 350. At step 360, whether or not the plating of the surrogate part was successful is determined. If the plating was not successful, the process can include altering the plating parameters and plating the surrogate part at step 364 and then returning to evaluating the plating at step 350. It is appreciated that the 350-360-364 loop or cycle can be repeated until a successful plating of the surrogate part is achieved. In the alternative, a different surrogate part can be selected at step 366 and plated using the desired and/or proposed plating parameters at step 340. This loop or cycles can also continue until the plating of a surrogate part is successful. At step 362 the database can be updated to include data that reflects the particular surrogate part that was successfully plated and the plating process parameters finally employed top achieve the successful plating.

Before, during, and/or after updating of the database at 362, the process can proceed to step 370 where the predetermined part is plated using the plating parameters that were employed at step 340 and resulted in a successful plating of the surrogate part as determined at step 360. Thereafter, the plated predetermined part can be evaluated at step 380, and whether or not the plating was successful can be determined at step 390. If the plating of the predetermined part was not successful, the plating parameters can be altered and the predetermined part plated using the altered plating parameters at step 394, followed by evaluation of the plating at step 380. The 380-390-394 loop or cycle can be continued until plating of the predetermined part is determined to be successful, at which time a standard operating procedure (SOP) can be established and the database can be updated at step 392. It is appreciated that the database can be updated to include data on the predetermined part and/or the plating process parameters that resulted in successful plating of the predetermined part.

It is appreciated that if the plating parameters are altered in an attempt to obtain a successful plating process for the plating of a surrogate part and/or a predetermined part, that a separate unplated surrogate and/or predetermined part can be plated with the altered parameters. Stated differently, an unsuccessful plated part would not be re-plated using altered plating parameters.

The parameters that may or may not be of interest and have data thereon stored within a database can be any parameter known to those skilled in the art that could prove useful in selecting a surrogate part to predict the plating success of a predetermined part. For example, Table 1 below provides an illustrative listing of design parameters, process and/or molding parameters, and material and/or color parameters that can be considered and used within the reinforcement learning system.

TABLE 1

| Design Parameters | Process/Molding Parameters | Material/Color Parameters |
| --- | --- | --- |
| Is there a radius on the surrogate part that is smaller than a radius on the predetermined part? | Are surrogate molding conditions the same as predetermined part molding conditions (for example gate direction, material flow direction, temperature, parting line location, surface stress)? | Does the surrogate part coating have the same color as a desired color for a coating on the predetermined part? |
| Is the surrogate part similar in size to the predetermined part? | Is current density area equal to or less than for surrogate part than for predetermined part? | Does the surrogate part have the same number of plating layers as the predetermined part? |
| Does an intended supplier for the predetermined part plate similar sized parts? | Is racking orientation for surrogate part the same as intended racking orientation for the predetermined part? | Does the surrogate part use the same plating bath material(s) as intended plating bath material(s) for the predetermined part? |
| Does the surrogate part have a more severe height-to-depth ratio than the predetermined part? | Does racking design used for the surrogate part have the same number of parts as intended for the predetermined part? | Is the chemistry of the plating bath for the surrogate part the same as an intended chemistry for a plating bath for the predetermined part? |
| Does the surrogate part have a more severe angle or radii than the predetermined part? | Does racking design used for the surrogate part have the same number of contact parts as intended for the predetermined part? | Do chemicals in the plating bath for the surrogate part use the same trade name(s) as plating bath chemicals intended for the predetermined part? |
| Does the surrogate part have an emblem pedestal if the predetermined part is to have an emblem pedestal? | Does racking design for the surrogate part use auxiliary anodes? | Does the surrogate part have/use the same substrate material as the predetermined part? |
| Are the depth and angles of an emblem pedestal more or less severe than for the predetermined part? | Does surrogate part use resistant finish paint, tape, etc., that is similar to any to be used for the predetermined part? | |
| Does the surrogate part have a grained surface area? | Can height-to-depth portion be painted for predetermined part? | |
| Is the grain depth of the surrogate part equal to or greater than the grain depth intended for the predetermined part? | Can radii be painted for predetermined part? | |
| Does the surrogate part have a grained surface with the same orientation as intended for the predetermined part? | Are narrow openings of the surrogate part similar to narrow openings of the predetermined part? | |
| Does the surrogate part have a plating thickness sufficient over the grained area? | Will the same supplier plate the predetermined part that has plated the surrogate part? | |

It is appreciated that the predetermined part may not be available at the time that the surrogate part is selected and thus the parameters for the predetermined part may be obtained from an intended design of the part. In addition, other factors that are known to those skilled in the art can be included and used within the reinforcement learning system and that one or more parameters can be weighted differently than other parameters manually and/or by the reinforcement learning system in order to improve a surrogate part selection.

The invention is not restricted to the illustrative examples, parameters, and the like described above. The examples, parameters, and the like are not intended as limitations on the scope of the invention. Other process parameters, plating processes, substrate materials, bath compositions, and the like described herein are exemplary and not intended as limitations on the scope of the invention. Changes therein and other uses will occur to those skilled in the art. The scope of the invention is defined by the scope of the claims.

We claim:

1. A process for selecting a surrogate part for metallic plating, the metallic plating of the surrogate part predicting results for metallic plating of a predetermined part, the process comprising:

providing a data input module operative to accept data on the predetermined part to be metallic plated;
providing a reinforcement learning system having a memory circuitry and a processing circuitry, the memory circuitry having a database with data associated with each of a plurality of surrogate parts;
entering data associated with the predetermined part into the data input module, the data including a desired set of plating parameters for plating the predetermined part;
calculating a difference between the data associated with the each of the plurality of surrogate parts and the data associated with the predetermined part using the processing circuitry; and
selecting one of the plurality of surrogate parts for metallic plating based on the difference between the data associated with the each of the plurality of surrogate parts and the data associated with the predetermined part.

2. The process of claim 1, further comprising metallic plating the surrogate part using the desired set of plating parameters to be used to metallic plate the predetermined part.

3. The process of claim 2, further comprising determining whether or not the metallic plating of the surrogate part using the desired set of plating parameters is successful.

4. The process of claim 3, wherein the metallic plating of the surrogate part using the desired set of plating parameters is successful and the database is updated with the data associated with the predetermined part.

5. The process of claim 1, wherein the data associated with the each of the plurality of surrogate parts includes design data selected from the group consisting of a minimum radius of curvature, an overall height, an overall width, an overall depth, a height-to-depth ratio, an angle, an emblem pedestal, a grained area and combinations thereof.

6. The process of claim 1, wherein the data associated with each of a plurality of surrogate parts includes process data selected from the group consisting of molding parameters, current density of plating process, racking orientation, racking design, plating-resistant paint, plating supplier and combinations thereof.

7. The process of claim 1, wherein the data associated with each of a plurality of surrogate parts includes material data selected from the group consisting of desired color of the metallic plating, number of plating layers, plating bath components, substrate material and combinations thereof.

8. A process for selecting a surrogate part for metallic plating, the metallic plating of the surrogate part predicting plating results for a predetermined part, the process comprising:
providing a data input module operative to accept data on a predetermined part to be metallic plated;
providing a reinforcement learning system having a memory circuitry and a processing circuitry, the memory circuitry having a database with data associated with each of a plurality of surrogate parts, the processing circuitry operative to compare data on the predetermined part to be metallic plated with data associated with the each of the plurality of surrogate parts;
entering data associated with the predetermined part into the data input module, the data including a desired set of plating parameters for plating the predetermined part;
comparing the data associated with the predetermined part with the data associated with the each of the plurality of surrogate parts;
computing a difference factor between the data associated with the predetermined part and the data associated with the each of the plurality of surrogate parts;
selecting one of the plurality of surrogate parts for plating based on the difference factor;
metallic plating the surrogate part using the desired set of plating parameters for plating the predetermined part;
determining whether or not the metallic plating of the surrogate part was successful;
updating the database with data associated with the desired set of plating parameters for the surrogate part if the metallic plating was successful;
metallic plating the predetermined part using the desired set of plating parameters;
determining whether or not the metallic plating of the predetermined part was successful; and
updating the database with data associated with the predetermined part if the metallic plating of the predetermined part was successful.

9. The process of claim 8, wherein the data associated with the each of the plurality of surrogate parts includes design data selected from the group consisting of a minimum radius of curvature, an overall height, an overall width, an overall depth, a height-to-depth ratio, an angle, an emblem pedestal, a grained area and combinations thereof.

10. The process of claim 8, wherein the data associated with each of a plurality of surrogate parts includes process data selected from the group consisting of molding parameters, current density of plating process, racking orientation, racking design, plating-resistant paint, plating supplier and combinations thereof.

11. The process of claim 8, wherein the data associated with each of a plurality of surrogate parts includes material data selected from the group consisting of desired color of the metallic plating, number of plating layers, plating bath components, substrate material and combinations thereof.

* * * * *